United States Patent [19]

Lehto et al.

[11] Patent Number: 5,066,320
[45] Date of Patent: Nov. 19, 1991

[54] METHOD FOR BENDING COMPLEX SHAPES ON A GLASS SHEET

[75] Inventors: Esko O. Lehto, Kangasala; Jukka H. Vehmas, Tampere, both of Finland

[73] Assignee: Tamglass Oy, Tampere, Finland

[21] Appl. No.: 544,519

[22] Filed: Jun. 27, 1990

[30] Foreign Application Priority Data

Mar. 30, 1990 [FI] Finland .................................. 901601

[51] Int. Cl.$^5$ .............................................. C03B 23/35
[52] U.S. Cl. ........................................ 65/106; 65/114; 65/288; 65/350
[58] Field of Search ................. 65/106, 114, 103, 107, 65/288, 350, 104, 287, 105, 273

[56] References Cited

U.S. PATENT DOCUMENTS

| | | | |
|---|---|---|---|
| 2,817,928 | 12/1957 | Lambert et al. | 65/104 |
| 3,020,677 | 2/1962 | White | 65/104 |
| 3,332,762 | 7/1967 | McMaster et al. | 65/25 |
| 3,526,489 | 9/1970 | McPhail | 65/287 X |
| 3,634,059 | 1/1972 | Miller | 65/273 |
| 3,819,349 | 6/1974 | Shimizu et al. | 65/287 X |
| 3,865,680 | 2/1975 | Reese et al. | 65/288 X |
| 4,260,409 | 4/1981 | Reese et al. | 65/273 |
| 4,497,645 | 2/1985 | Peltonen | 65/107 |
| 4,767,437 | 8/1988 | Lampman et al. | 65/104 |
| 4,767,439 | 8/1988 | Reunamäki | 65/351 |
| 4,778,507 | 10/1988 | Aruga et al. | 65/106 |
| 4,802,903 | 2/1989 | Kuster et al. | 65/273 X |
| 4,921,520 | 5/1990 | Carlomango | 65/273 X |

Primary Examiner—Robert L. Lindsay
Attorney, Agent, or Firm—Burns, Doane, Swecker & Mathis

[57] ABSTRACT

The invention relates to a method and a mould assembly for bending complex shapes on a glass sheet. The invention relates also to a bending mould and its manufacturing method. A heated glass sheet placed upon a ring mould is bent to its final shape by means of an over-head non-contacting mould (6) whose curved lower surface (7, 8) is provided with blasting orifices (10) and suction orifices (11). Blasting orifices (10) are used to blow hot air for heating a glass sheet at least locally while building an air cushion between shaping surface and glass sheet. The hot air blown from blasting orifices (10) is used to apply a greater heat volume to those sections of the glass sheet surface in which the bending radius of a glass sheet is the smallest or deformation (elongation, bending) is the greatest.

14 Claims, 4 Drawing Sheets

METHOD FOR BENDING COMPLEX SHAPES ON A GLASS SHEET

The present invention relates to a method for bending complex shapes on a glass sheet, said method comprising the following steps:
heating a glass sheet to bending temperature
supporting a heated glass sheet upon its edges on a ring mould whose shaping surface the final bending shape
bending a glass sheet to its final shape by pressing it from above against the ring mould with a non-contact mould whose lower surface matches the final bending shape.

The invention relates also to a bending mould assembly for bending complex shapes on a glass sheet, said assembly comprising:
a ring mould having a shaping surface which matches the final bending shape
a non-contact press bending mould whose lower surface serves as a bending and pressing surface and has a curved shape which matches the final bending shape and thus, to a great extent, matches also the shape of the shaping surface of said ring mould.

The invention relates also to a non-contact bending mould used in the bending method and bending mould assembly as well as to a method for the manufacture thereof.

Figure 5:
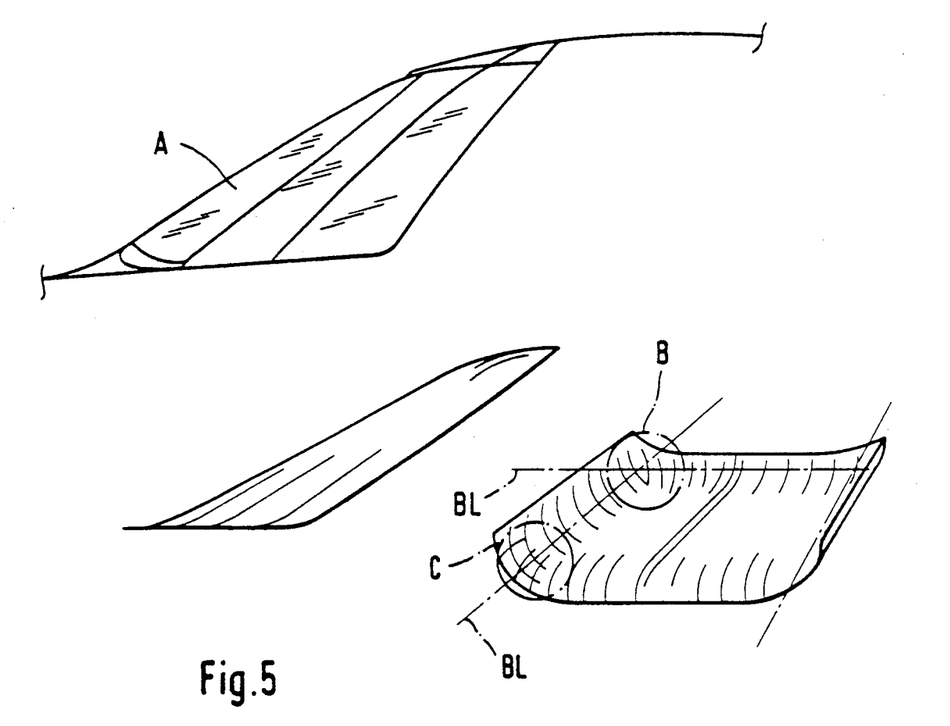
FIG. 5 shows examples of complex bending shapes which can be produced by means of a method and assembly of the invention.

The invention is particularly intended for use in such a bending apparatus, wherein a glass sheet is supported on a ring mould through the entire heating stage and the ring mould along with its glass sheet is carried from one heating section to another. This type of bending apparatus is disclosed in the Applicants' U.S. Pat. publication No. 4 497 645 and FI Patent application 885450. This prior known apparatus can be used for gravitationally bending conventional windshield shapes upon a ring mould. However, automobile industry is interested in windshields of more complex shape. An objective is to provide a windshield both with a vigorous double-bending and an aerodynamically preferable S-shape. FIG. 5 of the drawings illustrates this particular bending shape. If the windshield is studied from inside an automobile, the desired glass shape is such that the glass curves vigorously towards both sides and also towards the roof, with a spherical surface B forming at the crossings of bending lines BL. On the other hand, this requires elongation of glass within the spherical surface and its immediate marginal areas. If the elongation is not controlled and sufficient during the course of bending, the result is corrugation of the marginal area of a glass sheet in the proximity of a bending point. On the other hand, the lower glass edge should preferably deflect away from the driver, so the final outcome is an S-shape. An area C which is difficult to control is produced at the crossings of bending lines.

Several proposals have been made for methods and equipment that could be capable of bending such complex bending shapes but satisfactory results have not been accomplished. Bending shapes that require considerable local elongation of a glass sheet have not been possible to obtain or the end result has been optically unacceptable.

U.S. Pat. publication No. 3 634 059 discloses a press bending apparatus, wherein a heated glass sheet carried on a outline mould is bent to its final shape by means of the convex surface of an overhead press mould. The overhead press mould is primarily glass-contacting although, according to the cited publication, airholes opening onto the shaping surface can be used to produce an air cushion between shaping surface and glass sheet. The primary object of air blowing is to release a glass sheet from the shaping surface. However, it is not conceivable that mere air blowing should in any way contribute to the bending of a complex shape or even provide a controllably non-contacting mould bending since no controlled removal of blown air from between shaping surface and glass sheet is not arranged, nor is there arranged any heating of blown air or any application of heat to the area of vigorous deformations. As a result, the cited apparatus is only suitable for bending simple shapes.

U.S. Pat. publication No. 4 260 409 discloses a method and an apparatus for bending complex bending shapes, such as an S-shape, on a glass sheet. A heated glass sheet supported by an outline mould is bent between upper and lower press shaping surfaces. The shaping surfaces are in contact with glass. Within the areas of complex bending shapes a glass sheet is locally elongated, whereby said glass sheet shifts between the shaping surfaces. This results in abrasion of the glass surface. The contacting full surface moulds leave marks on the glass surface anyway, since the glass must be relatively soft (readily deformable) in order to achieve a complex shape.

U.S. Pat. publication No. 4 767 437 discloses a bending apparatus, wherein a heated glass sheet is carried from a furnace into a bending station by means of an overhead non-contacting vacuum transfer device provided with vacuum and blast orifices for keeping the glass sheet close to the lower surface of the transfer device. In bending station, the bending is effected between upper and lower press shaping surfaces. The shaping surfaces are glass contacting and it has not been possible to arrange any local control over the temperature of a glass sheet to be bent during a bending operation. Within the area of complex bending shapes, the glass sheet is forced to shift between the press shaping surfaces resulting in abrasion marks. Since there is no preheating of the areas to be bent during a bending operation, it has been necessary to "overheat" the entire glass sheet in a heating furnace to make it very soft, so that the glass sheet, still during a bending operation, could be bent in a manner that the necessary local elongations can take place. Although the configuration of a glass sheet can be forced between press surfaces to a substantially desired shape, the result is not optically acceptable. This prior known method and apparatus are not capable of producing the most difficult bending shapes in a manner that the result would be glass acceptable in its optical quality.

U.S. Pat. publication No. 4 778 507 discloses another example of a mould assembly intended for bending complex shapes, wherein a glass sheet supported on an outline mould is pressed with an overhead press mould. Also in this case, the press shaping surface is in contact with the glass sheet. The marginal edge areas of the press shaping surface are made sharply curving or the shaping surface so small in size that said press shaping surface does not come to contact with over those areas said glass sheet is supported by the outline mould. The use of a glass contacting mould leads to the same drawbacks as mentioned above with the exception of the margianl glass edge portions. However, in view of shaping the marginal edge portions of a glass sheet it would be preferable that a glass sheet could be pressed between an outline mould and a press mould. Otherwise the edge of glass will be formed into a corrguated shape in the immediate proximity of the spherical surface, whereat the bending glass will be subjected to compressive forces parallel to its own plane.

U.S. Pat. publiation No. 3 020 677 discloses an adjustable ring mould structure with cooling gas or vapour blowing equipment therebelow in the central area of the mould. Such equipment can be used to facilitate and enhance gravitational bending. A glass sheet is heated from above by electric resistance heating while applying cooling jets to the bottom surface of the less bending central portion of a glass sheet. Thus, the marginal edge areas of a glass sheet are softened to be readily bendable without the central portion softening too much and sagging downwards. The bending itself is effected gravitationally so there is no way to produce complex bending shapes in which a glass sheet is forced to local elongation.

U.S. Pat. publication No. 2 817 928 discloses a multistage bending method, wherein a heated glass sheet is pulled into contact with a shaping surface by means of vacuum prevailing between a glass sheet and a concave shaping surface. This is followed by lifting the bent glass sheet by means of an overhead convex-surfaced vacuum pickup. The edges of the uplifted glass sheet are heated and, by using the pickup as an upper press mould, the glass sheet is pressed into a lower outline mould whose shaping surfaces complement the desired final shape of the edge portions. In all bending stages the shaping surfaces are in contact with a glass sheet. In addition, the multi-stage nature of bending and the heating of marginal edge portions as a separate operation slow down the execution of the method.

U.S. Pat. publication No. 3 332 762 discloses an apparatus for bending a glass sheet and for tempering the bent glass sheet. The heating and bending of a glass sheet are effected by carrying a glass sheet in a furnace along a lengthwise base which is provided with jet orifices for supporting a glass sheet on a gas bed without a contact with the base. The base is gradually curving in the glass sheet advancing direction until the base has a curvature which corresponds to the desired final curvature of a glass sheet. Over the curved portion of the base, said base is provided both with jet orifices and outlet ports in order to bring a glass sheet in a controlled manner close to the curved lower supporting surface but without contacting it. The bent glass sheet is carried on the gas bed from the furnace to a tempering station provided on either side of a glass sheet with curved surface blastheads provided with cold tempering air blast orifices and outlet ports adjacent thereto for the effective and controlled circulation of air. This apparatus is not at all suitable for bending complex shapes. It is only suitable for bending a glass sheet around a single bending axis. Since contact with the glass surface is avoided, it is possible to produce optically high-quality bent and tempered glass. However, a gas bed furnace is a very expensive solution and its technical operation is difficult to control.

An object of the invention is to provide an improved method and a mould assembly for bending complex shapes on a glass sheet in a manner that the bending can be performed controllably also within areas in which a glass sheet is forced to undergo a vigorous local elongation without creating detrimental optical errors in these areas or immediately adjacent thereto.

This object is achieved by means of the invention on the basis of the characterizing features set forth in the annexed claims.

Thus, the invention makes use of a non-contacting overhead press mould having a curved lower shaping surface resembles the final bending shape of a glass sheet. The press mould is made non-contacting by utilizing an arrangement known as such from a gas bed furnace or overhead vacuum pickups, wherein the orifices in a shaping surface are used to blow a hot gas, primarily air and the adjacent orifices are used to discharge air or rather to intake air and to circulate it back to be blown through the blast orifices. The combination of blast and intake orifices accomplishes the effect that a glass sheet can be brought very close to a shaping surface but there is still produced between a glass sheet and a shaping surface a sufficient positive pressure for bending and shaping a glass sheet without contact with the shaping surface. If a mould having a relatively large area is used to blow hot air only, a problem will be the uncontrolled escape of air whereby the flows between glass and mould can be highly unbalanced and can thus lead to optical and shaping errors as a result of the non-uniform heating of glass. In addition to this, the blowing system is utilized in the invention for heating a glass sheet at least locally and in such focused manner that a glass sheet will be more readily shapeable in those areas which require the most drastic deformation. If an entire glass sheet is heated to be sufficiently hot for bending a complex or difficult shape, the central area of a glass sheet could bend too much as a result of gravitational sagging.

When bending an S-shape it may be necessary to support a glass sheet from below over a locally limited area. This can be done by using below a glass sheet a local auxiliary mould which is designed to be non-contacting the same way as the overhead press mould. However, in a partially surfaced auxiliary mould a system of just blasting orifices may be sufficient if the mould has a small surface area. The lower shaping surface can also be provided with degassing grooves.

One embodiment of the invention will now be described in more detail with reference made to the accompanying drawings, in which.

Figure 1:
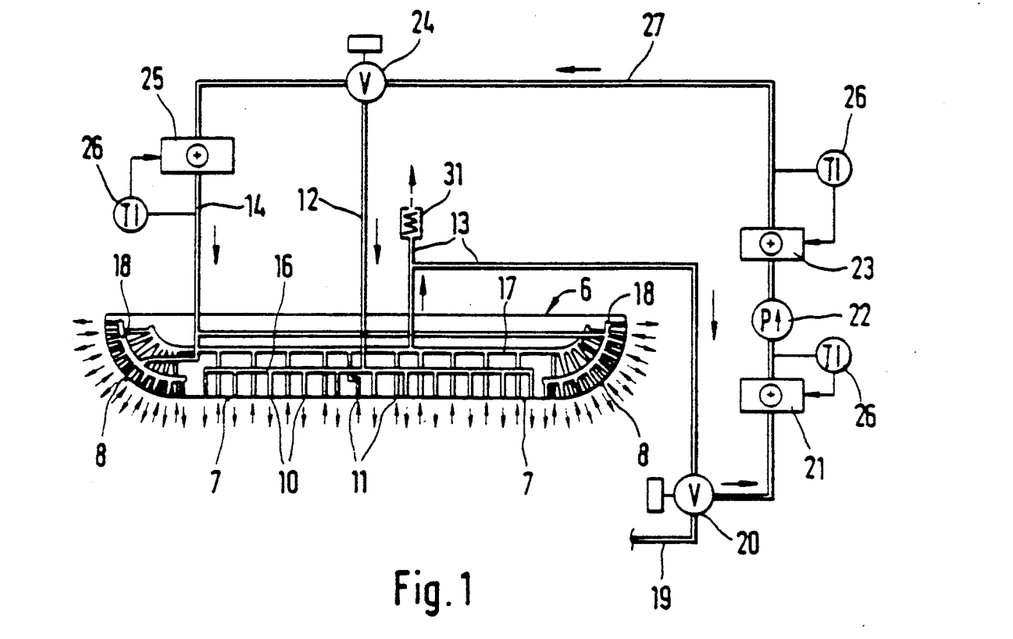
FIG. 1 shows a diagram of an assembly used for carrying out a method of the invention.
Figure 1A:
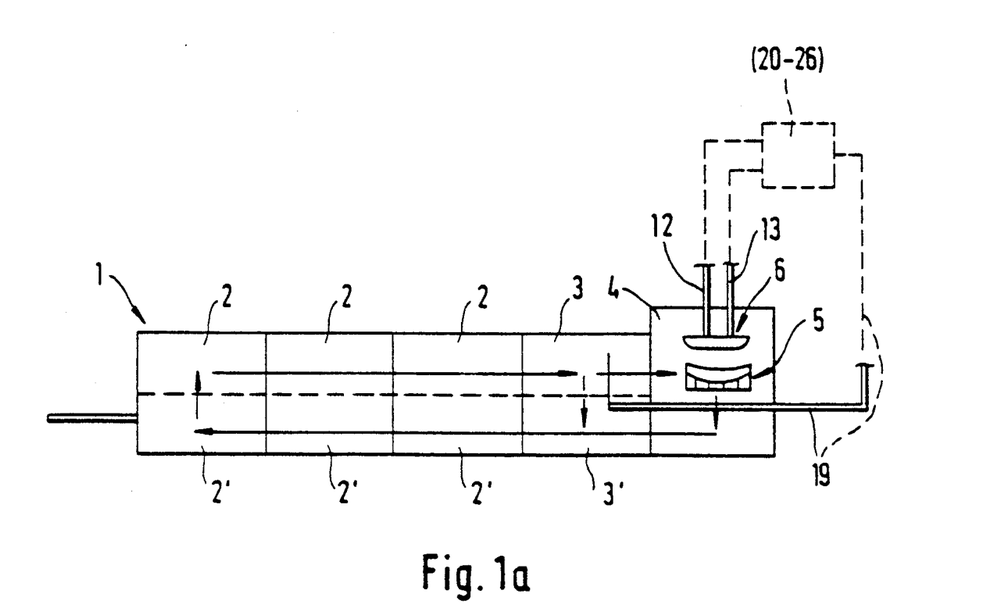
FIG. 1a is a side view of a furnace unit wherein the present invention can be applied.

FIG. 1 illustrates a furnace unit 1 whose construction and operation are described in more detail in U.S. Pat. No. 4 497 645, cited here as reference. A glass sheet to be bent is carried as supported by a ring mould 5 from a heating section 2 into another. In the final heating section 3, which also serves as a bending station for simple shapes, the glass reaches its softening temperature and through the action of gravity begins to bend towards a shaping surface defined by the curving edges of an outline mould. If the question is about a simple bending shape which a glass sheet attains by its own gravity, the ring mould together with its glass sheet is transferred into a chilling section 3' placed below heating section 3 and further through chilling sections 2' to the upstream end of furnace 1 wherein a bent glass sheet is removed from the ring mould.

When the question is about a complex bending shape, wherein a glass sheet must undergo a considerable elongation within the bending area and its immediate vicinity, a ring mould 5 along with a glass sheet thereon is carried into a particular bending section 4 for complex shapes provided with an overhead press bending mould 6 having a downward-directed curved shaping surface 7, 8. The shaping surface has a central area 7 with a large radius of curvature and marginal edge portions 8 with a small radius of curvature. Accordingly, the bending of a glass sheet 9 (FIG. 2) is slight within the central area and in the proximity of edges, especially within the corner areas, the bending occurs at a small radius of curvature around criss-crossing bending axes, even to the shape of a spherical surface, substantial deformations occurring within the bending areas and in the immediate vicinity thereof upon the bending and elongation of a glass sheet. The configuration of shaping surface 7, 8 must complement this complex, multiply curved bending shape.

Figure 2:
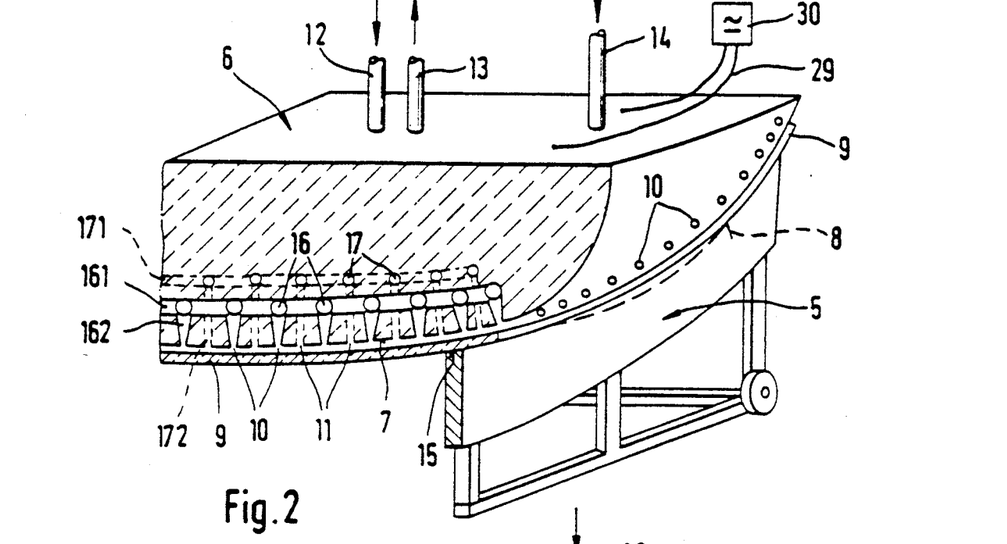
FIG. 2 is a perspective view of a portion of a mould assembly the invention in vertical section.

FIGS. 1 and 2 illustrate blasting orifices 10 opening into the surface of a press mould 6 and connected by means of a system of in-mould supply ducts 16 to a pressurized gas line 12. Opening to the mould surface are corresponding suction or outlet air orifices 11 which are connected by means of an in-mould manifold 17 to a suction or outlet line 13. Supply or distributor ducts 16 are connected to each other by means of transverse connecting channels 161. Also manifolds 17 are joined together by means of transverse connecting channels 171. Thus, the distributor ducts 16 and connecting channels 161 produce a ladder-shaped or mesh-shaped supply manifold. The same way the manifolds 17 and connecting channels 171 produce a ladder-shaped or mesh-shaped collecting manifold. In the illustrated case, the blasting air supply manifold is divided into two separate channel systems. Within the area of curved shaping surfaces 8 inside said mould 6 there is a separate supply manifold 18 connected to blasting orifices 10, the latter manifold being connected to a separate blasting air supply pipe 14. Between the manifolds and orifices are provided nozzle ports 162, 172.

As shown in the pipe line diagram of FIG. 1, hot air is drawn from a furnace 1 by means of a pipe 19 and distributed through a three-way control valve 20 to the suction side of a fan 22. On both sides of fan 22 are heaters 21 and 23 which are controlled by thermostats 26. From the pressure side of fan 22 hot air is passed by means of a pipe 27 through an adjustable three-way control valve 24 into pressure gas lines 12 and 14. The valve 24 can be used to control the proportion of blasting air between lines 12 and 14. Thus, it is possible to control the proportion of blasting air between the less and more curved sections 7 and 8 of the mould surface. The supply line 14 can be further fitted with an adjustable heater 25 for blowing hotter air to the most curved section 8 of the mould surface and to its immediate vicinity than to the less curved section 7. The suction or outlet pipe 13 connected by way of manifold 17 to suction or putlet ports 11 is connected to a valve 20 capable of controlling the interrelation of the mounts of air coming from pipe 19 and pipe 13. Thus, the valve 20 is capable of controlling the effect of suction prevailing on the mould surface in relation to the effectiveness of blowing. During the bending, blowing must always overcome suction to the degree that there is created a positive pressure between mould surface 7, 8 and a glass sheet 9 for preventing contact between mould surface and glass sheet but permitting, however, the mould surface to come extremely close to the surface of a glass sheet. The required size and spacing or orifices as well as blasting and suction air pressures can be calculated experimentally. As exemplary figures indicating the magnitude it can be stated that the diameter of blasting and suction orifices can be 2-10 mm, e.g. 5 mm. Blasting and suction orifices can be arranged either stepwise in adjacent rows or alternately in the same rows of orifices. The distance between blasting and suction orifices can be 20-50 mm, e.g. 30 mm.

As an alternative to the example shown in FIG. 1 a method of the invention can also be carried out by using a mould provided with just one blasting air supply manifold 16 which connects a supply pipe 12 to all blasting air orifices 10. In this case, the blasting orifices 10 in the most curved sections 8 of the mould surface and in the immediate vicinity thereof are located more densely and/or made larger for directing the heating effect of hot blasting air to those areas of a glass sheet where the deformation is most vigorous. Similarly, by changing the orifice size and orifice spacing between blasting and suction orifices 10 and 11 it is possible to have an effect on the pressure development between mould surface 7, 8 and glass sheet 9 in a manner that the glass-sheet bending higher pressure is achieved on the most curved surface areas 8.

When carrying out a method of the invention the mould assembly operates as follows. At the outset of furnace 1, a cold and flat glass sheet or two or more superimposed glass sheets are placed upon an outline mould 5. The outline mould 5 is provided with a mould surface 15 which corresponds to the desired final curvature of a glass sheet, so in the flat condition a glass sheet is only supported on the corner areas of outline mould 5. The glass sheet is heated gradually by carrying it on mould 5 from a heating section 2 into another. Temperature in each heating section 2 is higher than in the preceding one. In the final heating section 3 the glass sheet reaches its softening temperature and bends through the action of gravity. The curvature of a glass sheet in the marginal edge areas supported by mould surface 15 approaches the curvature of mould surface 15. When the question is about a complex bending shape, a glass sheet cannot be heated to such a high temperature that the curvature of its marginal area would in all areas reach the curvature of mould surface 15 since the central area of a glass sheet would be sagging to undesired curvature. Even otherwise the narrow annular mould surface 15 of outline mould 5 is not capable by itself to define the desired bending shape within the area inside mould surface 15 when the question is about a more complex bending shape.

The outline mould 5 together with its glass sheet 9 is transferred into a complex shape bending section 4 below a press bending mould 6. The glass may be gravitationally partially bent but the glass need not be prebent as the entire bending can be effected by a press mould by utilizing the heat focusing in blowing. The press bending mould 6 is descended and while blowing hot air from blasting orifices 10 of the shaping surface.

temperature of the hot air being precisely adjusted in a manner that the glass sheet is heated to a temperature sufficient for bending. By virtue of the above-described mould structure a proportionally larger amount of hot air and/or hotter air is blown to those sections of the surface of glass sheet 9 in which the glass sheet has the smallest bending radius or the greatest elongation. Accordingly, a relatively smaller amount of hot air and/or colder air is blown to those sections of the surface in which the bending radius is the largest or deformation the smallest. The basis for technical effect of the invention is just this effective focusing of heating effect on the most deforming sections of a glass sheet effected in connection with non-contacting press mould bending. The non-contacting shaping surface is used to apply a bending force to a glass sheet simultaneously with locally concentrated heating action.

As the shaping surface 7, 8 of press mould 6 approaches the surface of glass sheet 9, the blowing through blasting orifices 10 can be reduced and/or the suction through suction orifices 11 can be increased for bringing the shaping surface and the glass sheet very close to each other at the final bending stage. However, at initial stage of bending the blowing must be sufficiently powerful relative to suction so that the bending and heating actions are effective already when the shaping surface is approaching the glass surface.

Since the blasting air is hotter than glass, the top surface of glass sheet 9 is hotter than the bottom surface during bending. This offers the advantage that over its non-supported central area the glass sheet does not curve too much as a result of gravitational sagging. This action can be further enhanced by directing cooling jets to the bottom surface of glass sheet 9 within those sections that have bent sufficiently already at the initial stage of press mould bending. In other words, during the course of press mould bending the jets of a cooling medium are directed for a short period to certain points on the bottom surface of a glass sheet.

The bottom surface can be cooled in many other ways as well, e.g. by using black surfaces for controlling the amount of thermal radiation emitted by the glass.

When bending certain complex shapes, such as an S-shape, it may be necessary to support a glass sheet from below during press mould bending. The support from below can be effected by means of a non-contacting partial-surface mould 6' (FIGS. 8 and 9) which in general structural design corresponds to the overhead press mould 6. However, the lower counterpart mould 6' can be relatively small in size and locally limited to that critical surface section which could otherwise bend downwards beyond the desired shape. Due to the small size of the shaping surface, the lower counterpart mould need not be necessarily provided with an array of suction or outlet orifices either. If necessary, the shaping surface can be provided with a set of grooves controlling the degassing action.

Figure 6:
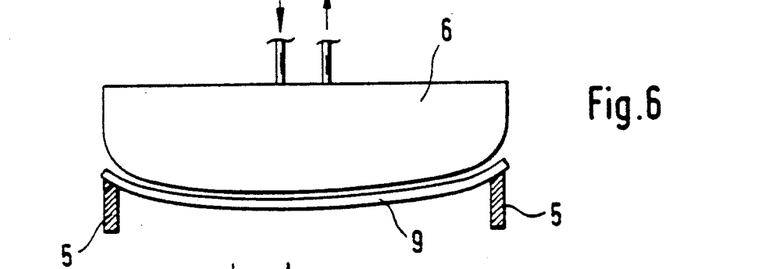
FIGS. 6-9 illustrate various applications for a mould of the invention at various bending shape complexity levels.

FIG. 6 illustrates application of the invention to the bending of a complex bending shape by using a combination of an outline mould 5 and an overhead press bending mould 6. In this context, a complex bending shape refers to the case in which the bending lines cross over each other.

Figure 7:
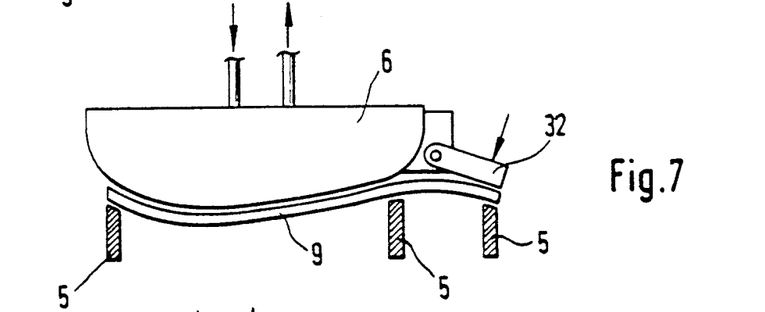

FIG. 7 illustrates an embodiment in which, in addition to the above-mentioned complex bending shape, a glass sheet must be provided with a simple S-shape. This allows the use of a partial-surfaced press bending mould 6 provided with a mechanical press member 32 for enhanced downward bending of the marginal edge area of glass.

Figure 8:
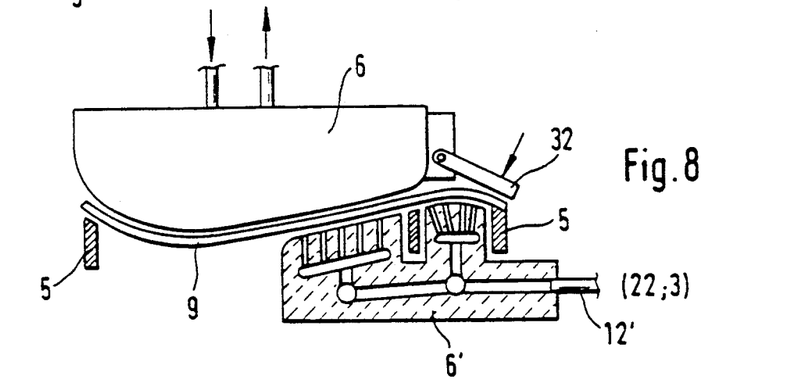

FIG. 8 differs from the preceding one in the sense that there is further used a lower partial-surfaced mould 6' which is only provided with an array of blasting orifices connected to a pressure line 12' which is supplied with hot gas the same way as in FIG. 1 by means of a fan 22 from a furnace section 3. Naturally, the lower mould 6' can also be provided with an array of suction orifices the same way as overhead mould 6 if this is required by the size of a shaping surface or the complicated shape of a surface to be bent.

Figure 9:
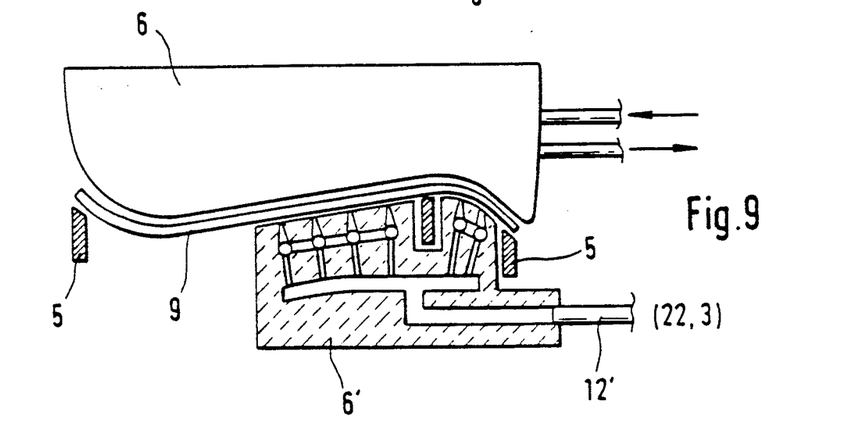

The embodiment of FIG. 9 differs from FIG. 8 in that there is used an overhead full-surface mould 6. This arrangement is capable of bending a relatively complex glass shape combined with a complex S-shape.

Figure 3:
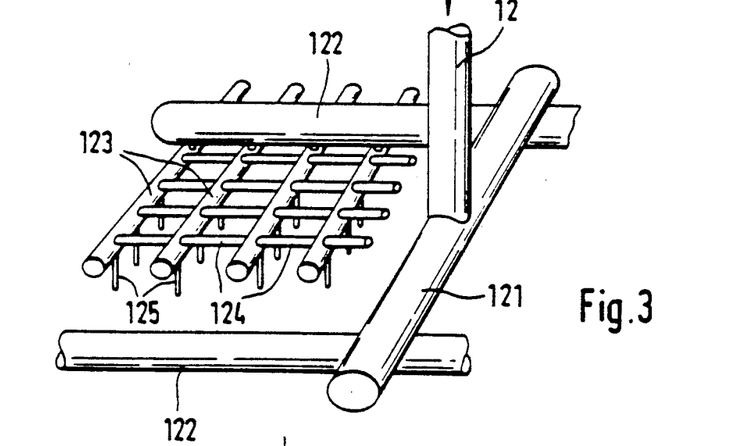
FIGS. 3 and 4 are perspective views of portions of temporary channelling fillings used in the manufacture of a mould.
Figure 4:
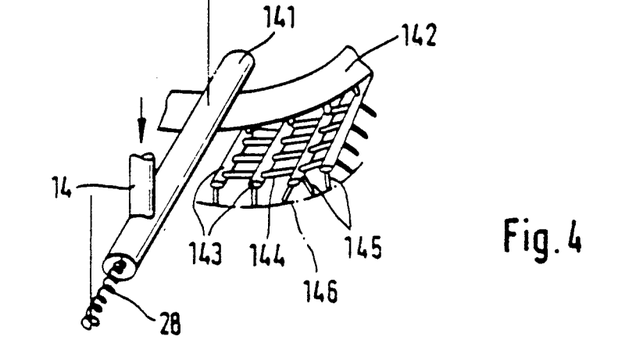

The following is a description of the manufacturing technique of a non-contacting press mould 6 with reference made to FIGS. 3 and 4. A solid substance, which is a combustible, solvent dissoluble or hot running or flowing substance, is employed for building ladder-shaped or mesh-shaped structures 121-125 and 141-145 which correspond to the desired in-mould distributing and intake manifolds. These particular substances include e.g. certain plastics, certain grades of rubber, certain cellular plastics, organic adhesive bound casting cores (turn to sand after combustion), low melting point metals etc. The structural components can be tubular or massive depending on a substance used. The filling components 123 are similar e.g. to pipes 16 shown in FIG. 2, the pins or stubs 125 providing nozzle ports 162 between pipes 16 and orifices 10. Accordingly, the filling components 143, 144 of FIG. 4 make up a manifold 18 shown in FIG. 1 and pins or stubs 145 form the nozzle ports leading to orifices 10. Reference numeral 146 indicates an arcuate screen curve formed by the ends of pins or stubs 145. These ladder-shaped or mesh-shaped structures are placed in the casting mould of bending mould 6. Some heat resistant setting mass, e.g. ceramic mass, is cast around the structures and the mass is allowed to set at least partially. This is followed by heating the bending mould 6 to such a high temperature that the material of structures 121-125 and 141-145 burns and escapes as combustion gases or transforms to a running or flowing state. In addition to this, the temporary duct filling can be dissolved with solvents and removed from the manifold by flushing. Instead, the hot air supply pipes 12, 13 and 14 are made of a high-temperature resisting material, such as asbestos.

This mould manufacturing technique also offers a possibility of placing the heating elements needed in hot-air blowing inside the mould 6 itself. FIG. 4 shows an electric resistance 28 which is fitted inside a filling component 141 and has its wires 29 connected to a source of electric power 30, as shown in FIG. 2. The resistance elements 28 can be used for locally heating the air blown to the most curving areas of a shaping surface in relation to the air to be blown elsewhere. Thus, an electric resistance 28 can replace a heating element 25 shown in FIG. 1. Even in this case there is no need for a separate supply branch 14 along with a separate distributing manifold 18. The local application of heating effect for carrying out a method of the invention can thus be resolved in many different ways and it is obvious that the invention is not limited to any particular solution but various combinations and modifications thereof are possible. Also in other respects, the above-described embodiment has not been presented in the sense restricting the invention but only as an example of putting the invention into practice. For example, a suction pipe 13 need not necessarily be connected to a vacuum device (the suction side of fan 22) but said suction pipe 13 can open directly to ambient air. An intermediate solution between these two can be such that a vacuum valve 31 opens a communication with ambient air as soon as the vacuum or negative pressure in pipe 13 reaches a certain reading or becomes zero.

When using a mould assembly of the invention it is also possible that, as the press mould is approaching, the glass is only subjected to blowing from orifices aligned with the smallest bending radii, the heat transfer being intensified only for the most dramatic deformations. It is also possible that a press mould 6 is not moved at all in vertical direction but the approaching is effected by lifting the outline mould and a glass sheet. In addition, the effect of heat focusing can be regulated by varying the direction of blasting orifices 10 relative to shaping surface 7, 8, whereby the alignment of said orifices can be utilized for obtaining a desired flow between the glass and the shaping surface. The blowing and suction air pipes 27 and 13 can be connected to a fan and a vacuum source also in a manner that the blowing and suction can be regulated during the course of bending completely independently of each other. It is also possible to have such an arrangement that certain sections of the surface are only provided with blasting orifices 10 and/or that the number and size of blasting orifices 10 in relation to the number and size of suction orifices 11 vary in different sections of the surface. An overhead full-surface mould can also be provided at the bending line with more suction orifices. This makes it possible to produce a higher positive pressure between the shaping surface and a glass sheet wherever it is mostly needed during a bending operation. The suction and blasting orifices are not necessarily arranged at uniform spacing even in the surface sections outside the bending lines but the number and size can vary also in the flat section of the surface.

The hot gas to be blown is substantially air which can be admixed e.g. gases or vapours contributing to the quality of glass surface. For example, the use of $SO_2$ produces a protective coating on glass surface so that a temporary contact between glass and a shaping surface does not as readily leave a mark on glass surface.

Following the bending, a glass sheet is carried on an outline mould into a chilling section 3', 2' where it is stagewise slowly chilled or annealed when proceeding towards a point of unloading.

If necessary, a glass sheet can be carried on an outline mould also into a tempering section, so a method of the invention can also be applied in the bending of automotive backlights.

A mould provided with a suction and blasting manifold can also be used for bending a glass sheet by means of vacuum by arranging the ratio between suction and blasting in a manner that the vacuum between shaping surface and glass attracts the glass to the immediate proximity of a shaping surface wherein, with the glass preventing the escape of suction air, is produced the equilibrium before the glass comes into contact with the shaping surface.

A mould of the invention can also be used as a vacuum pickup after the bending.

We claim:

1. A method for bending complex shapes on a glass sheet, said method comprising the steps of heating a glass sheet to a bending temperature, supporting a heated glass sheet upon its edges on a ring mould whose shaping surface substantially matches the final bending shape, bending a glass sheet to its final shape by pressing the sheet from above against a ring mould with a non-contacting mould whose lower shaping surface substantially matches the final bending shape, creating on the lower surface of the non-contacting mould between the mould and a glass sheet a positive pressure and a heating effect for heating a glass sheet at least locally by blowing a hot gas through blasting orifices made in the shaping surface and by removing the gas or by allowing the gas to escape through suction or outlet orifices made in the shaping surface, whereby on the most curving sections of the shaping surface and in the immediate vicinity thereof said blasting orifices blow a hot gas whose amount per unit area and/or temperature exceeds the amount and/or temperature of the air blown from blasting orifices located in the less curving sections of the shaping surface.

2. A method for bending complex shapes on a glass sheet, said method comprising the steps of heating a glass sheet to a bending temperature, supporting a heated glass sheet upon its edges on a ring mould whose shaping surface substantially matches the final bending shape, bending a glass sheet to its final shape by pressing it from above against a ring mould with a non-contacting press bending mould whose lower shaping substantially matches the final bending shape, assisting the bending with a lower partial-surface mould whose upper shaping surface substantially matches the final bending shape, creating on the surfaces of the non-contacting mould and the partial-surface mould between the moulds and a glass sheet a positive pressure and a heating effect for heating a glass sheet at least locally by using blasting orifices of both shaping surfaces to blow a gas having at least the same temperature as the glass and by removing the gas or by allowing the gas to escape through suction or outlet orifices of at least the upper shaping surface, and using the blasting orifices of the shaping surfaces during a bending operation to blow a proportionally larger amount of hot air or hotter air to those sections of the surface of a glass sheet in which the glass sheet has the smallest bending radius or the greatest deformation and a proportionally smaller amount of hot air or cooler air to those sections of the surface in which the bending radius is the largest or deformation is the least.

3. A method as set forth in claim 1 wherein, when the shaping surface of the non-contacting press bending mould approaches the surface of a glass sheet, at least one of the steps of reducing the blowing through the blasting orifices of the shaping surface and increasing the suction through the suction orifices of the shaping surface is undertaken.

4. A method as set forth in claim 1 wherein, a hot gas blown during the bending of a glass sheet through the blasting orifices of the shaping surface of the press bending mould is used to maintain a top surface of a glass sheet at least locally hotter than a bottom surface.

5. A method as set forth in claim 4, c h a r a c t e r i z e d in that the central area of the bottom surface of glass sheet (9), wherein bending and/or deformation is the least, is subjected to a chilling blast while bending the glass sheet to its final shape by means of said non-contacting press bending mould (6).

6. A method as set forth in claim 1 or 2, wherein a glass sheet (9) is supported to ring mould (5) for the entire heating stage and said ring mould (5) along with its glass sheet (9) is carried from a heating section (2) into another, c h a r a c t e r i z e d in that simple bending shapes are bent in the final heating section (3) in a conventional manner gravitationally and only complex bending shapes are bent in a separate bending section (4) for complex bending shapes, into which said ring mould (5) along with its heated glass sheet (9) is transferred from said final heating section (3) below said non-contacting press bending mould (6).

7. A method as set forth in claim 1, wherein at least some of the blasting air to be blown through the blasting orifices of the shaping surface is drawn from said heating section, hot air being passed therefrom into the non-contacting press bending mould placed in said separate bending section for complex bending shapes, and said ring mould is transferred along with its heated glass sheet from the final heating section into said bending section below the non-contacting press bending mould.

8. A method as set forth in claim 1 wherein, at least some of the suction air to be discharged through suction orifices of shaping surface of said non-contacting press bending mould is blown through blasting orifices of the shaping surface back in between shaping surface and glass sheet.

9. A method as set forth in claim 2, wherein the shaping surface of non-contacting press bending mould approaches the surface of glass sheet, the blowing is reduced through blasting orifices of the shaping surface and/or suction is increased through the suction orifices of the shaping surface.

10. A method as set forth in claim 2, wherein a hot gas blown during the bending of a glass sheet through blasting orifices of the shaping surface of press bending mould is used to maintain a top surface of glass sheet at least locally hotter than a bottom surface.

11. A method as set forth in claim 10, wherein a central area of the bottom surface of glass sheet, wherein bending and/or deformation is the least, is subjected to a chilling blast while bending the glass sheet to its shape with said non-contacting press bending mould.

12. A method as set forth in claim 2, wherein a glass sheet is supported to ring mould for the entire heating stage and said ring mould along with its glass sheet is carried from a heating section into another, wherein simple bending shapes are bent in a final heating section in a conventional manner gravitationally and only complex bending shapes are bent in a separate bending section for complex bending shapes, into which said ring mould along with its heated glass sheet is transferred from said final heating section below said non-contacting press bending mould.

13. A method as set forth in claim 2, wherein at least some of the blasting air to be blown through blasting orifices of the shaping surface is drawn from a heating section, hot air being passed therefrom into the non-contacting press bending mould placed in a separate bending section for complex bending shapes, and said ring mould is transferred along with its heated glass sheet for the final heating section into said bending section below the non-contacting press bending mould.

14. A method as set forth in claim 2, wherein at least some of the suction air to be discharged through the suction orifices of the shaping surface of said non-contacting press bending mould is blown through the blasting orifices of the shaping surface back in between the shaping surface and a glass sheet.

* * * * *